(12) United States Patent
Ciano et al.

(10) Patent No.: US 10,169,056 B2
(45) Date of Patent: Jan. 1, 2019

(54) EFFECTIVE MANAGEMENT OF VIRTUAL CONTAINERS IN A DESKTOP ENVIRONMENT

(71) Applicant: INTERNATIONAL BUSINESS MACHINES CORPORATION, Armonk, NY (US)

(72) Inventors: Giuseppe Ciano, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 15/252,681

(22) Filed: Aug. 31, 2016

(65) Prior Publication Data

US 2018/0060091 A1 Mar. 1, 2018

(51) Int. Cl.
G06F 9/451 (2018.01)
G06F 8/61 (2018.01)
G06F 9/455 (2018.01)

(52) U.S. Cl.
CPC ............... G06F 9/452 (2018.02); G06F 8/61 (2013.01); G06F 9/45558 (2013.01); G06F 2009/45591 (2013.01)

(58) Field of Classification Search
CPC .... G06F 9/4445; G06F 9/45529; G06F 9/452; G06F 9/45558; G06F 2009/45591
See application file for complete search history.

(56) References Cited

U.S. PATENT DOCUMENTS

| | | | |
|---|---|---|---|
| 7,904,886 B2 | 3/2011 | Dufour et al. | |
| 8,407,696 B2 | 3/2013 | Alpern et al. | |
| 8,484,728 B2 | 7/2013 | De Atley et al. | |
| 8,909,761 B2 | 12/2014 | Reynolds et al. | |
| 9,098,698 B2 | 8/2015 | Ghosh et al. | |
| 9,116,768 B1 | 8/2015 | Sawhney et al. | |
| 2009/0157711 A1* | 6/2009 | Baer | G06F 17/3089 |
| 2011/0125719 A1* | 5/2011 | Jayaraman | G06F 17/30156 |
| | | | 707/692 |
| 2012/0246647 A1 | 9/2012 | Ciano et al. | |
| 2013/0198764 A1 | 8/2013 | Kacin et al. | |
| 2017/0177860 A1* | 6/2017 | Suarez | G06F 21/53 |
| 2018/0027070 A1* | 1/2018 | Jhanji | H04W 4/08 |
| | | | 709/217 |

OTHER PUBLICATIONS

Abdelbaky, et al., "Docker Containers Across Multiple Clouds and Data Centers", 2015 IEEE/ACM 8th International Conference on Utility and Cloud Computing, pp. 1-4.
Zeltser, L., "Security Risks and Benefits of Docker Application Containers", https://zeltser.com/security-risks-and-benefits-of-docker-application, Last Accessed, May 25, 2016, pp. 1-5.

* cited by examiner

Primary Examiner — Camquy Truong
(74) Attorney, Agent, or Firm — Tutunjian & Bitetto, P.C.; Scott Dobson

(57) ABSTRACT

A method and system are provided for identifying installed software components in a container running in a virtual execution environment. The container is created by instantiating image data. The method includes determining a respective identifier for each of individual layers of a layered structure of the image data. The method further includes retrieving from a repository storage arrangement, information identifying at least one of the installed software components in the container, based on the respective identifier for at least one of the individual layers.

20 Claims, 12 Drawing Sheets

| Product Name | Type | VM/OS | Status |
|---|---|---|---|
| Product 210C | Normal | Host/Windows | Started |
| Product 210D | Normal | Host/Windows | Stopped |
| Product 231A | Container | Container 230/Linux | Starting |
| Product 241A | Container | Container 240/Windows | Started |
| Product 241B | Container | Container 240/Windows 2003 Server | Started |

FIG. 4

EFFECTIVE MANAGEMENT OF VIRTUAL CONTAINERS IN A DESKTOP ENVIRONMENT

BACKGROUND

Technical Field

The present invention relates generally to information processing and, in particular, to effective management of virtual containers in a desktop environment.

Description of the Related Art

Virtualization essentially lets one computer do the job of multiple computers, by sharing the resources of a single computer across multiple environments. Virtual servers and virtual desktops allow a user to host multiple operating systems and multiple applications locally and in remote locations, freeing the user from physical and geographical limitations. In addition to energy savings and lower capital expenses due to more efficient use of hardware resources, the building of a virtual structure provides high availability of resources, better desktop management, increased security, and improved disaster recovery processes. Virtualization is becoming more popular day by day and thus desktops are increasingly including common native applications installed on it as well as products available in virtualization environments.

However, problems exist in desktop management when there is more than a single type of application to be managed. Some of the common problems include, for example, the tools used to list software installed on a desktop not having the capability to manage the virtual environments available on the system and the software installed in virtual environments. For example, the Windows® Add/Remove Programs feature does not provide any information about products installed in containers. Another problem is that it is not possible to interact from a single point of management with the virtual containers for security and patch management. Traditional antivirus and compliance manager software can check and manage the software that is installed in a traditional way (that is, not in a container) but they cannot check and manage the software that is installed inside a container. A trivial way to address it is to install a copy of the antivirus/compliance manager in each container, but this is not efficient in terms of performance and resource utilization. Yet another problem is that it is not possible to interact with virtual containers using the auto-start capability of external devices. For example the scenario could be: insert a DVD and at the auto-run phase select the container where you want to install the product. Thus, there is a need for effective management of virtual containers in a desktop environment.

SUMMARY

According to an aspect of the present principles, a method is provided for identifying installed software components in a container running in a virtual execution environment. The container is created by instantiating image data. The method includes determining a respective identifier for each of individual layers of a layered structure of the image data. The method further includes retrieving from a repository storage arrangement, information identifying at least one of the installed software components in the container, based on the respective identifier for at least one of the individual layers.

According to another aspect of the present principles, a computer program product is provided for identifying installed software components in a container running in a virtual execution environment. The container is created by instantiating image data. The computer program product includes a computer readable storage medium having program instructions embodied therewith. The program instructions are executable by a computer to cause the computer to perform a method. The method includes determining a respective identifier for each of individual layers of a layered structure of the image data. The method further includes retrieving from a repository storage arrangement, information identifying at least one of the installed software components in the container, based on the respective identifier for at least one of the individual layers.

According to yet another aspect of the present principles, a system is provided for identifying installed software components in a container running in a virtual execution environment. The container is created by instantiating image data. The system includes a processor, configured to determine a respective identifier for each of individual layers of a layered structure of the image data. The processor is further configured to retrieve from a repository storage arrangement, information identifying at least one of the installed software components in the container, based on the respective identifier for at least one of the individual layers.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 shows an exemplary table depicting product information for products in a computing system (relating to step 330 of FIG. 3), in accordance with an embodiment of the present principles;

DETAILED DESCRIPTION

The present principles are directed to effective management of virtual containers in a desktop environment. For example, in an embodiment, the present principles provide efficient management of applications present in virtual containers in a desktop environment.

In an embodiment, the present principles use a particular sequencing and usage of Application Programming Interfaces (APIs) and commands that the specific virtualization vendor provides to implement management of virtual environments in a desktop.

Advantageously, the present principles manage the products installed in the classic way (that is, not in a virtual container) and also all the products installed and available in the virtual containers. The present principles also provide the capability to select from the host operating system a virtual container as a target for installing/updating/removing new products. Moreover, the present principles are able to perform security and compliance checks of software that is installed in multiple containers without requiring an installation of antivirus software and a software compliance manager in each of the containers. Additionally, the present principles are able to show/start/stop applications inside an existing container along with traditional applications.

Figure 1:
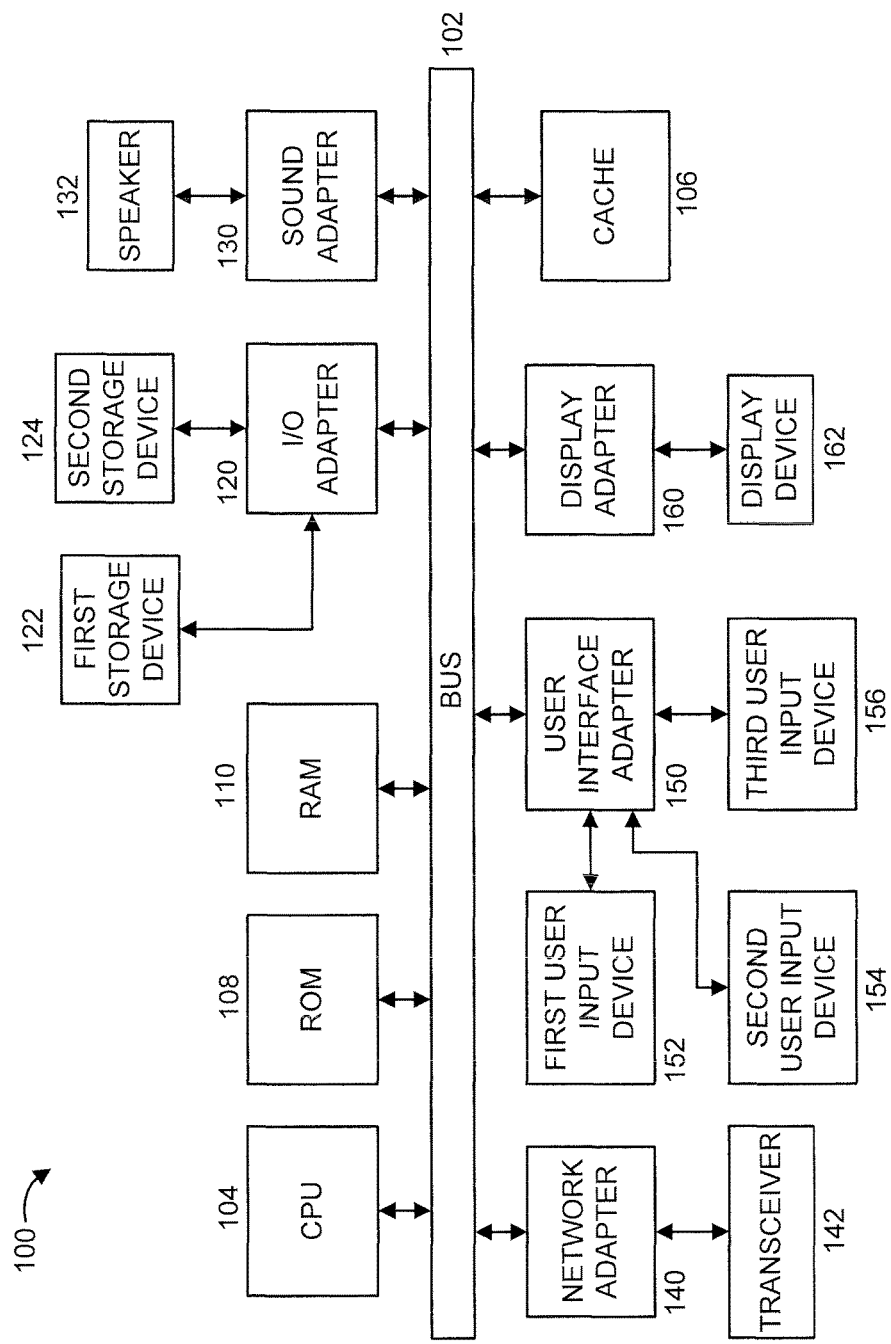
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
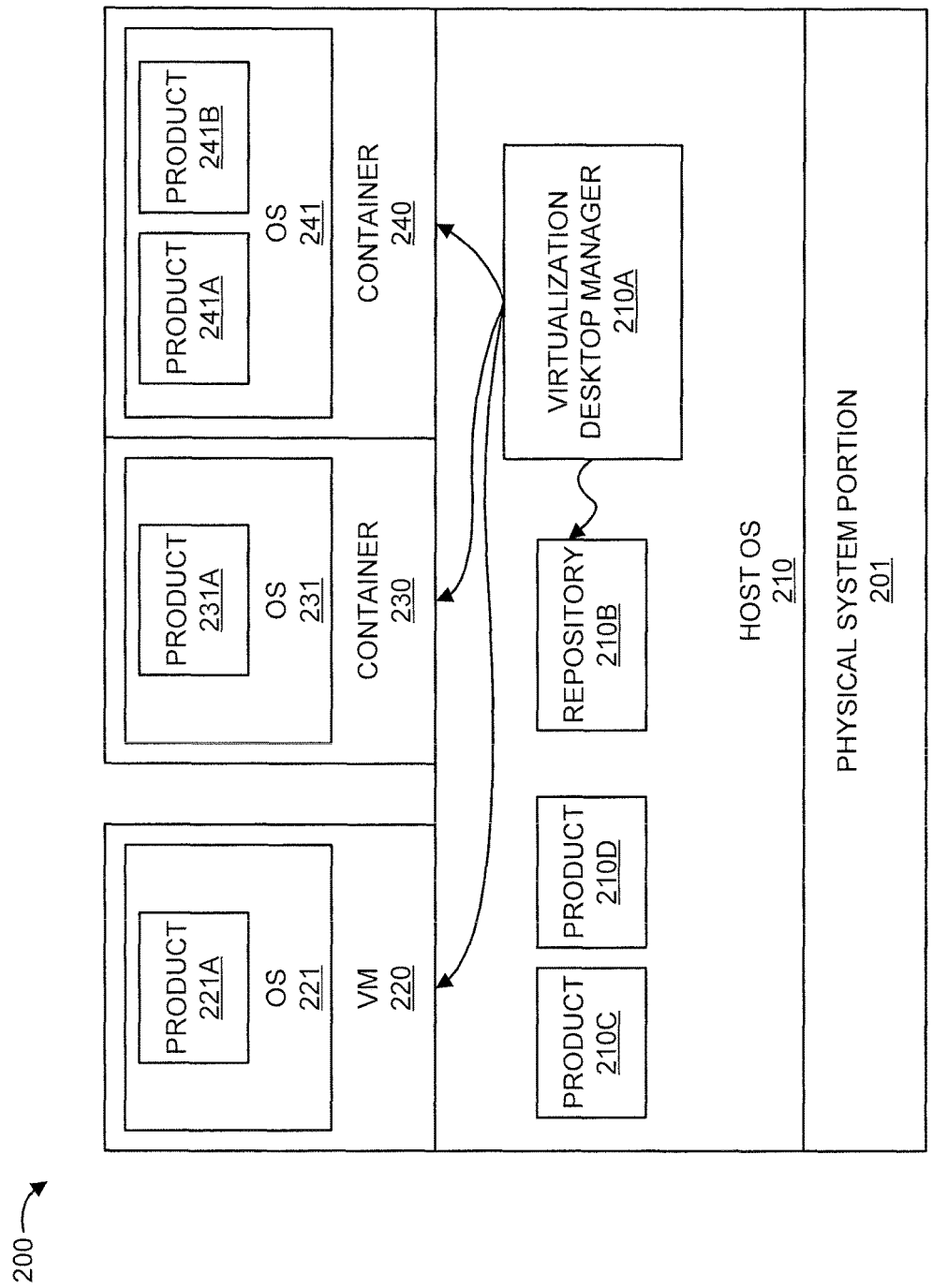
FIG. 2 shows an exemplary system for efficient management of virtual containers in a desktop environment, in accordance with an embodiment of the present principles.
Figure 7:
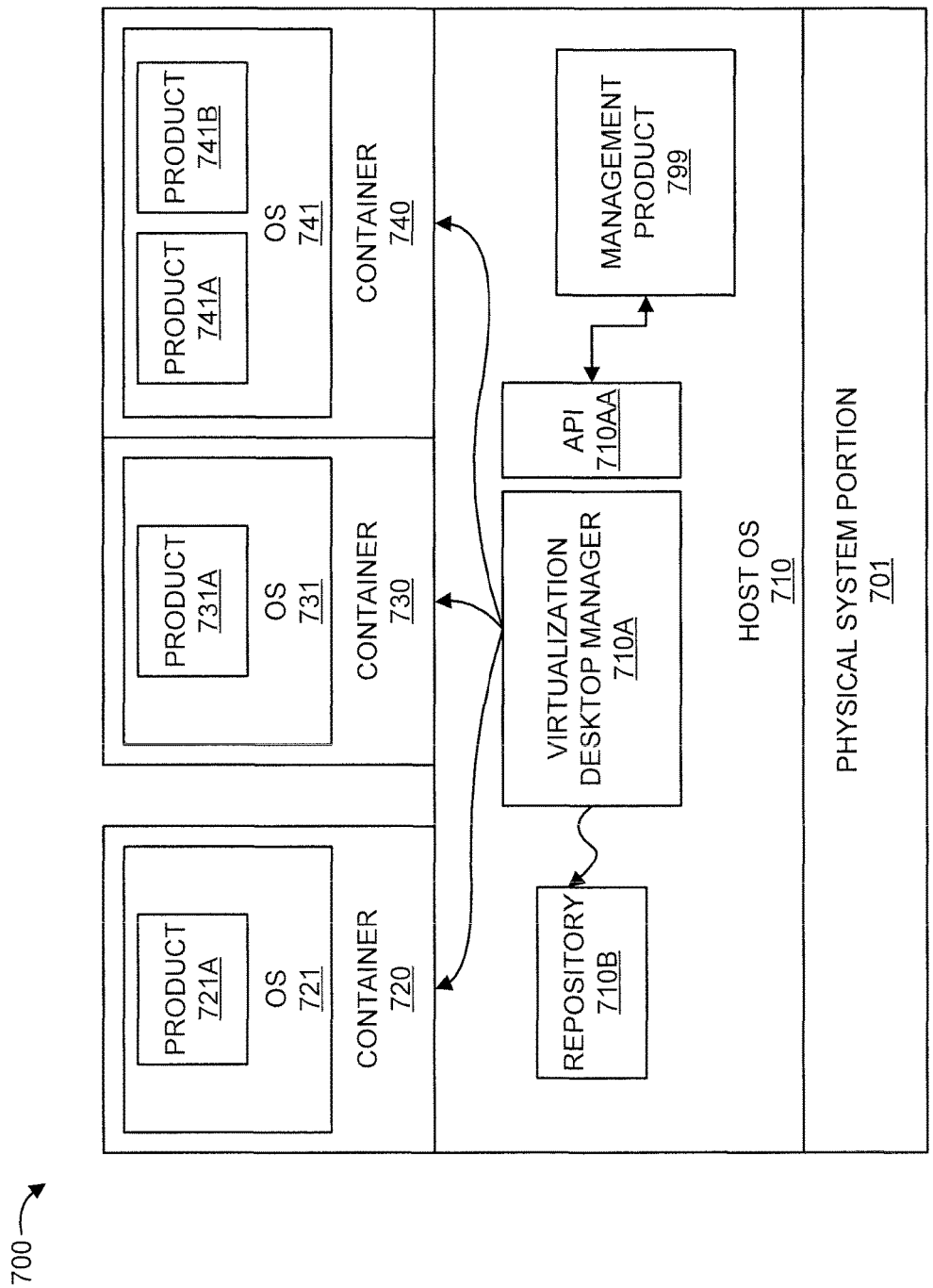
FIG. 7 shows another exemplary system for efficient management of virtual containers in a desktop environment, in accordance with an embodiment of the present principles.

Moreover, it is to be appreciated that systems 200 and 700 respectively described below regarding FIG. 2 and FIG. 7 are systems for implementing respective embodiments of the present principles. Part or all of processing system 100 may be implemented in one or more of the elements of system 200 and/or system 700.

Figure 3:
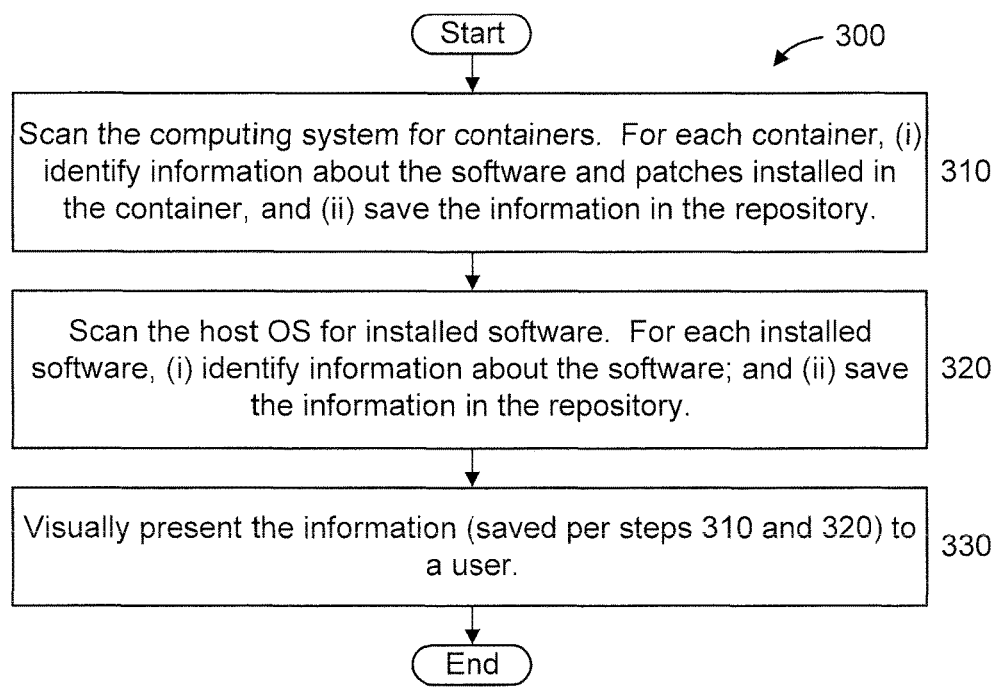
FIG. 3 shows an exemplary method for efficient management of virtual containers in a desktop environment, in accordance with an embodiment of the present principles.
Figure 5:
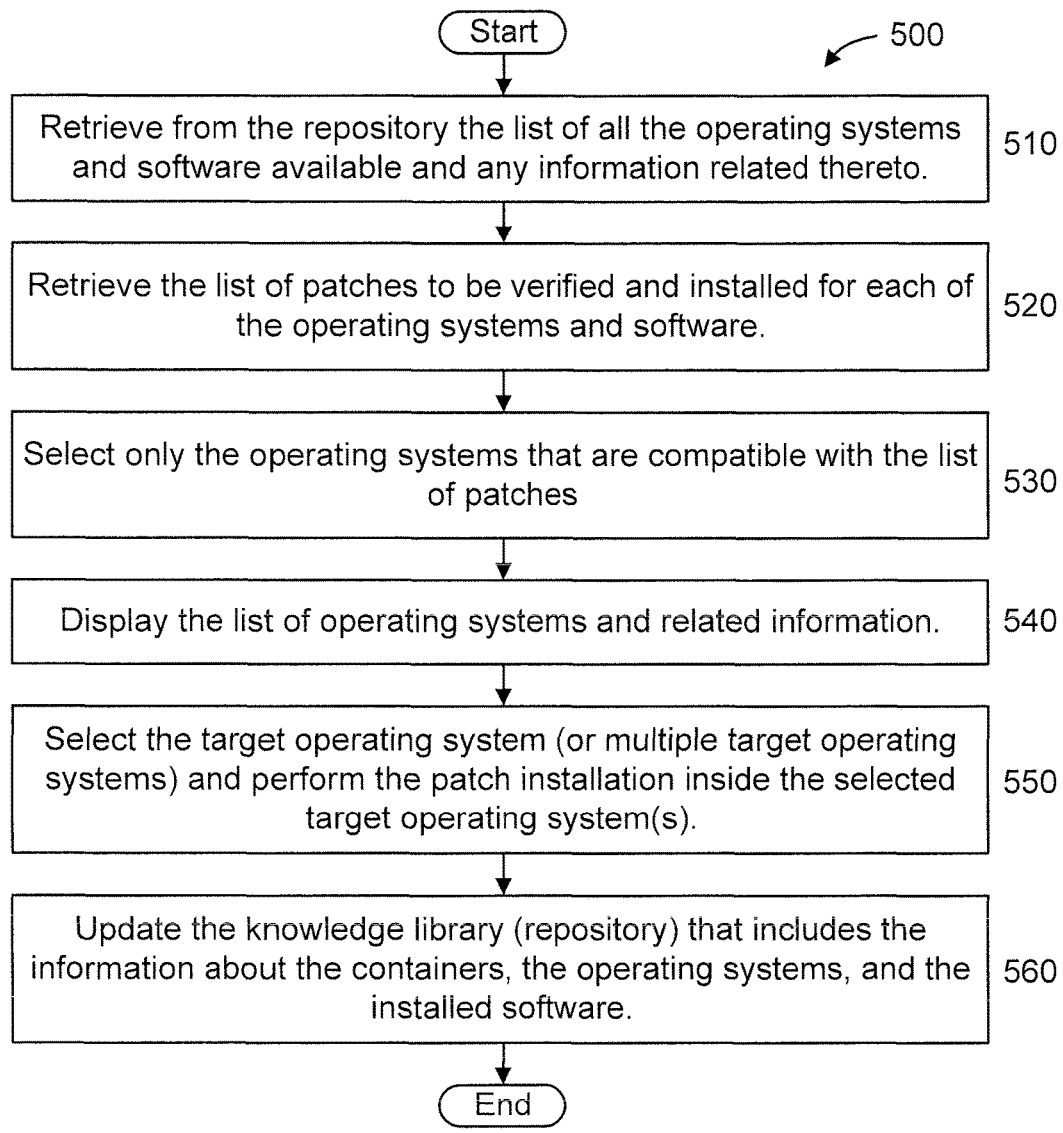
FIG. 5 shows an exemplary method for a first exemplary scenario to which the present principles can be applied, in accordance with an embodiment of the present principles.
Figure 8:
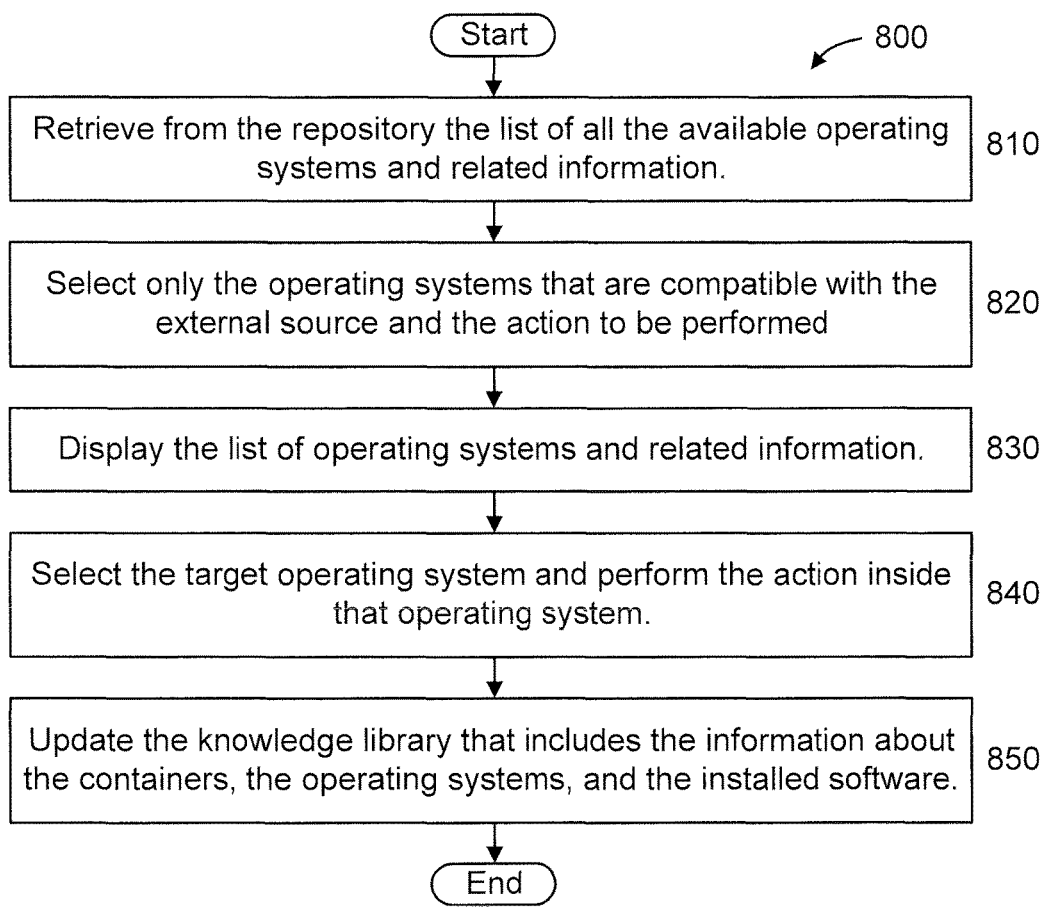
FIG. 8 shows an exemplary method for a second exemplary scenario to which the present principles can be applied, in accordance with an embodiment of the present principles.
Figure 10:
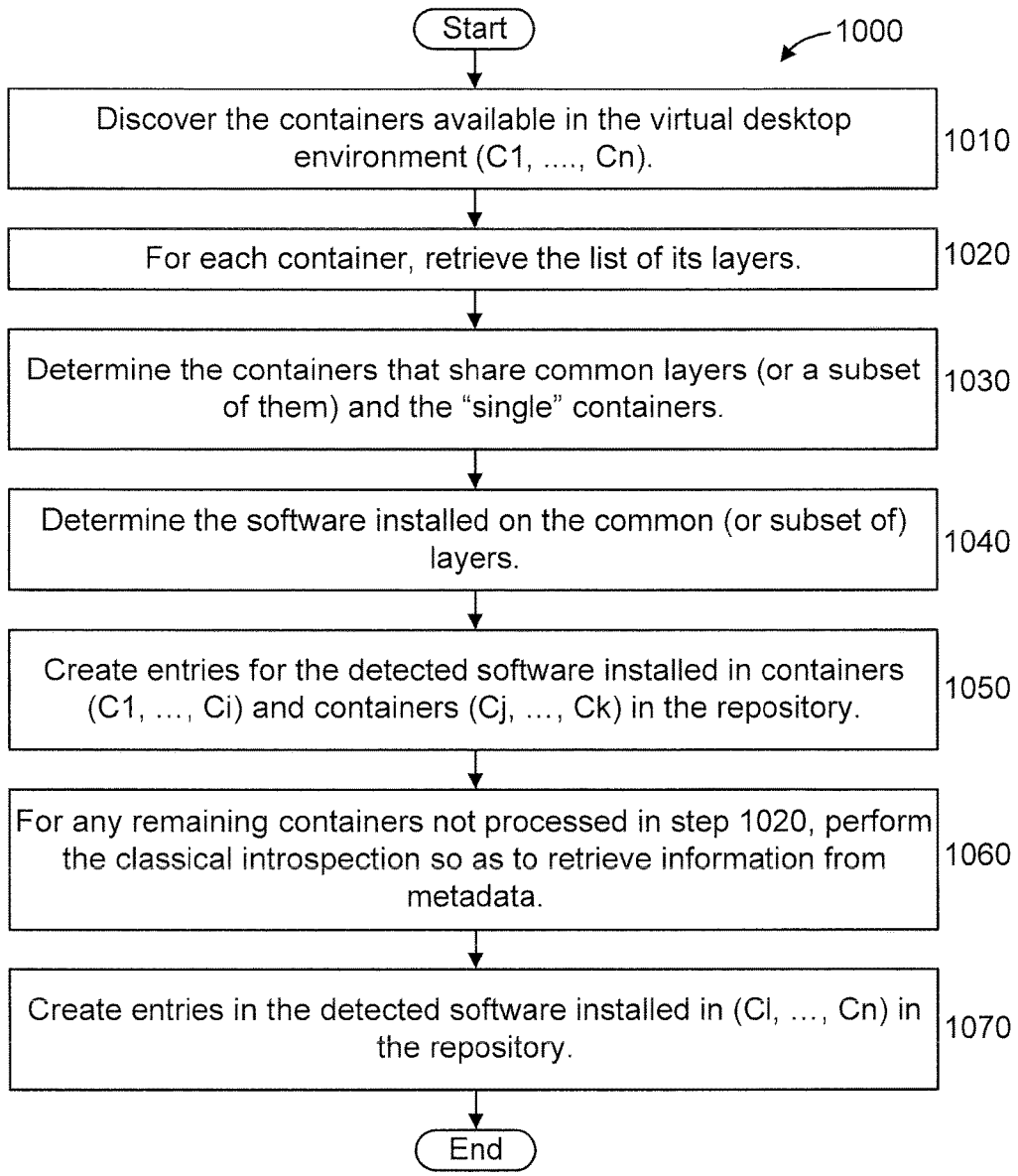
FIG. 10 shows another exemplary method for efficient management of virtual containers in a desktop environment, in accordance with an embodiment of the present principles.

Further, it is to be appreciated that processing system 100 may perform at least part of the methods described herein including, for example, at least part of method 300 of FIG. 3 and/or at least part of method 500 of FIG. 5 and/or at least part of method 800 of FIG. 8 and/or at least part of method 1000 of FIG. 10. Similarly, part or all of system 200 may be used to perform at least part of method 300 of FIG. 3 and/or at least part of method 500 of FIG. 5 and/or at least part of method 800 of FIG. 8 and/or at least part of method 1000 of FIG. 10.

FIG. 2 shows an exemplary system 200 for efficient management of virtual containers in a desktop environment, in accordance with an embodiment of the present principles.

The system 200 includes a physical system portion 201, a host Operating System (OS) 210, a Virtual Machine (VM) 220, a container 230, and a container 240.

The host OS 210 includes a Virtualization Desktop Manager (VDM) 210A, a repository 210B, a product 210C, and a product 210D.

The VM 220 includes an operating system 221. The operating system 221 includes a product 221A.

The container 230 includes an operating system 231. The operating system 231 includes a product 231A.

The container 240 includes an operating system 241. The operating system 241 includes a product 241A and a product 241B.

The VDM 210A is a software entity that retrieves: (i) information about the containers; and (ii) information about products installed in the containers.

The repository 210B stores information about the containers and application stack available in the containers and all the others products discovered. The repository 212 can also include the list of patches applied.

The VDM 210A displays and manages all the products available in the system providing details such as, for example, if they are local applications or running in containers. The VDM 210A can also provide external Application Programming Interfaces (APIs) (e.g., API 710AA in FIG. 7) that can be used by external callers to get information related to the containers and the applications/patches installed inside the containers.

FIG. 3 shows an exemplary method 300 for efficient management of virtual containers in a desktop environment, in accordance with an embodiment of the present principles. The method 300 advantageously discovers and displays all the software products available in a computing system.

At step 310, scan the computing system for containers. For each container, (i) identify information about the software and patches installed in the container, and (ii) save the information in the repository. In an embodiment, such information can include, but is not limited to, product/software name, product/software type, virtual machine/operating system, an operational status, and so forth. In an embodiment, the information can be obtained used Docker® or other software container related commands.

At step 320, scan the host OS for installed software. For each installed software, (i) identify information about the software; and (ii) save the information in the repository. In an embodiment, such information can include, but is not limited to, product/software name, product/software type, virtual machine/operating system, an operational status, and so forth. In an embodiment, the information can be obtained used Docker® or other software container related commands. The scan performed per step 320 can scan for conventionally installed software (that is, software not installed in a container) as well as software installed in a container.

At step 330, visually present the information (saved per steps 310 and 320) to a user. The information can be visually presented, for example, in a task bar and/or application bar on a display device. Of course, other presentation constructs (than a task bar and application bar) can also be used to present the information, while maintaining the spirit of the present principles. The information can be presented to allow sorting and filtering on the rows, depending upon the layout of the information and the construct used to present the information. Also, the information can be presented such that a set of actions can be executed on the information. For example, the information can be presented such that a set of actions can be executed on at least some of the rows. Such actions include, but are not limited to, add/remove/update/details/start/stop/etc.

Further regarding step 310, invocation modes for the system scanning can include, but are not limited to, being: (i) performed manually; (ii) scheduled to run periodically; and (iii) triggered from an event received from a Virtual Management Console (provided by vendors, such as, for example, management product 799 shown in FIG. 7) based on the deployment/dismissal of a new container.

FIG. 4 shows an exemplary table 400 depicting product information for products in a computing system (relating to step 330 of FIG. 3), in accordance with an embodiment of the present principles. The table 400 can be provided, for example, in a task bar and/or application bar. Of course, other presentation constructs can also be used to present the information shown in table 400, while maintaining the spirit of the present principles.

The table 400 includes a product name column 401, a type column 402, a VM/OS column 403, and a status column 404.

The information about the status of the applications installed in the containers is also maintained in the repository so that it is possible to easily understand if the applications are running or not.

FIG. 5 shows an exemplary method 500 for a first exemplary scenario to which the present principles can be applied, in accordance with an embodiment of the present principles. The first exemplary scenario relates to a security/compliance check. The security/compliance check can be, for example, of critical patches installed in multiple operating systems (e.g., host and containers) available in a desktop.

The method 500 is performed when a security/compliance check is triggered (e.g., manually or based on a periodic schedule or based on an event).

At step 510, retrieve from the repository the list of all the operating systems and software available and any information related thereto.

At step 520, retrieve the list of patches to be verified and installed for each of the operating systems and software.

At step 530, select only the operating systems that are compatible with the list of patches (for example, it is not possible to install a Windows® patch on Linux®)

Figure 6:
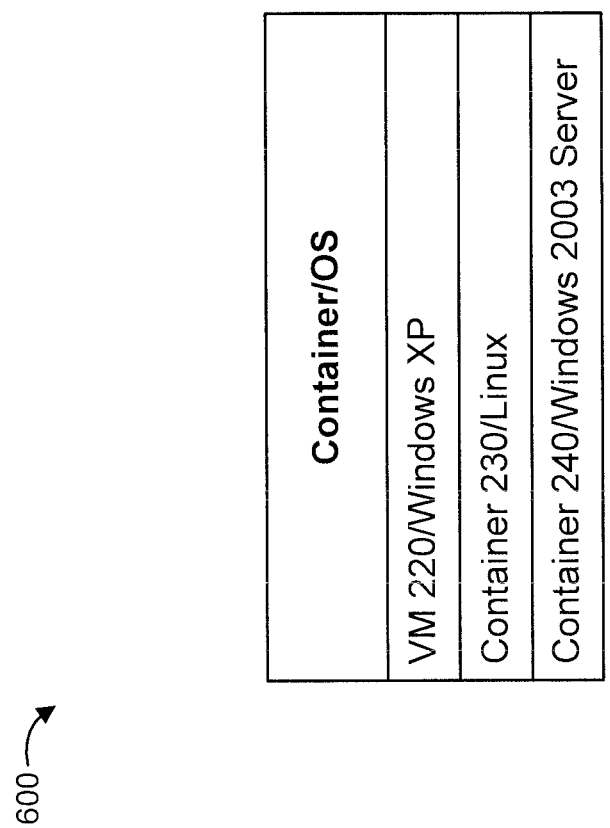
FIG. 6 shows an exemplary table depicting container information for containers in a computing system (relating to step 530 of FIG. 5), in accordance with an embodiment of the present principles.

At step 540, display the list of operating systems and related information. FIG. 6 shows an exemplary table 600 depicting container information for containers in a computing system (relating to step 530 of FIG. 5), in accordance with an embodiment of the present principles.

At step 550, select the target operating system (or multiple target operating systems) and perform the patch installation inside the selected target operating system(s). This task can be also automated if the patch has some properties such as, for example, but not limited to, patch_autoinstall=Yes. It is possible to also decide if the patch is to be installed in all the selected operating systems at the same time or if the patch is to be installed (e.g., per a schedule) at different times for each of the operating systems.

At step 560, update the knowledge library (repository) that includes the information about the containers, the operating systems, and the installed software.

FIG. 7 shows another exemplary system 700 for efficient management of virtual containers in a desktop environment, in accordance with an embodiment of the present principles.

The system 700 includes a physical system portion 701, a host Operating System (OS) 710, a Virtual Machine (VM) 720, a container 730, and a container 740.

The host OS 710 includes a Virtualization Desktop Manager (VDM) 710A and a repository 710B.

The VM 720 includes an operating system 721. The operating system 721 includes a product 721A.

The container 730 includes an operating system 731. The operating system 731 includes a product 731A.

The container 740 includes an operating system 741. The operating system 741 includes a product 741A and a product 741B.

The VDM 710A includes an Application Programming Interface (API) 710AA. The API 710AA interfaces with a management product 799. The management product 799 can be, for example, but is not limited to, a compliance manager, a security manager, a software scanner, and a virtual management console.

Thus, system 700 exploits the VDM 710A and the services that the VDM 710A provides to the external products for interacting with the operating systems and software installed inside the containers.

The information can be retrieved directly from the containers or from the repository if a container is offline. In this way, callers can manage in a transparent way the content of the containers.

FIG. 8 shows an exemplary method 800 for a second exemplary scenario to which the present principles can be applied, in accordance with an embodiment of the present principles. The second exemplary scenario relates to external device interaction with multiple operating systems. For example, the second scenario can relate to interactions between external devices and the multiple operating systems (e.g., host and container operating systems) available in a desktop.

The method 800 is performed when a device requires selecting a target directory to perform an action. An example includes when the DVD auto-run starts the setup program asking for a drive.

At step 810, retrieve from the repository the list of all the available operating systems and related information.

At step 820, select only the operating systems that are compatible with the external source and the action to be performed (for example, it is not possible to install a Windows® application on Linux®).

At step 830, display the list of operating systems and related information. Table 6 shown and described with respect to FIG. 6 shows such an exemplary list.

At step 840, select the target operating system and perform the action inside that operating system.

At step 850, update the knowledge library that includes the information about the containers, the operating systems, and the installed software.

Figure 9:
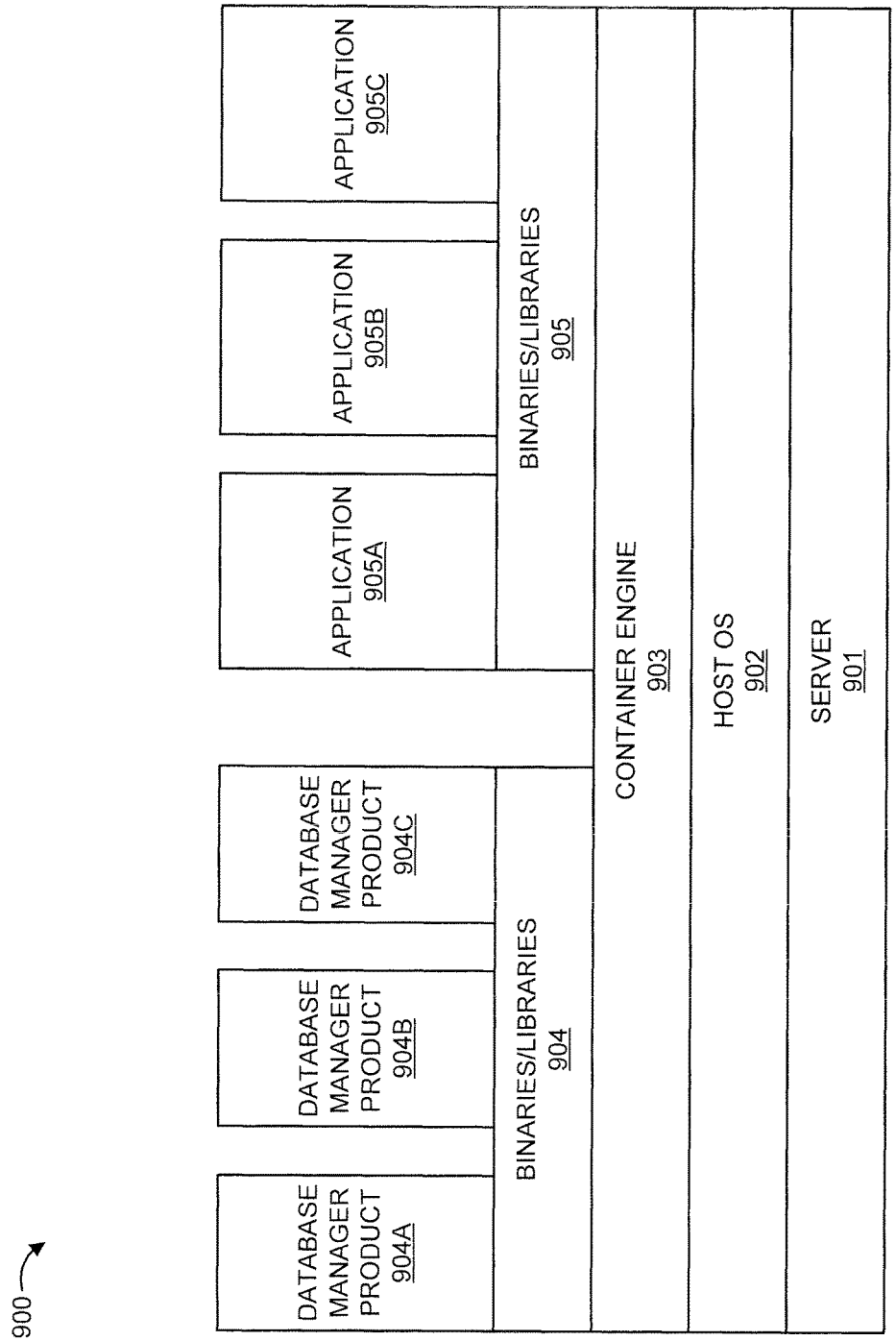
FIG. 9 shows an exemplary container to which the present principles can be applied, in accordance with an embodiment of the present principles.

FIG. 9 shows an exemplary container 900 to which the present principles can be applied, in accordance with an embodiment of the present principles.

The container 900 is included in a server 901 having a host operating system 902. The host operating system 902 includes a container engine 903. The container engine 903 includes binaries/libraries 904 and binaries/libraries 905. The binaries/libraries 904 include a database manager products 904A, 904B, and 904C. The binaries/libraries 905 include applications 905A, 905B, and 905C.

For the sake of illustration, the container engine 905 relates to a Docker® engine for a Docker® container. Docker® images are read-only templates from which Docker® containers are launched. Each image includes a series of layers that can, in turn, include not only the applications but the operating system itself that can be different from the host operating system. These layers can be shared between all the containers installed on the same system so if they are already present they are not downloaded and installed during the deployment of a new container. Of course, other container related software than Docker® can also be readily used in accordance with the teachings of the present principles, while maintaining the spirit of the present principles. As such, other types of images other than Docker® images can be used to determine layer and/or product information for installed software products in accordance with the teachings of the present principles, while maintaining the spirit of the present principles.

Thus, in an embodiment, we are able to retrieve the layers of the installed containers and then understand the operating system and the applications installed by analyzing these layers without the need to introspect the VMs. This of course has significant benefits in terms of performance and scalability. Hence, the present principles introduce a software method to discover and retrieve the operating system and software installed in the containers exploiting the layer information and without the need to connect to all VMs and being able also to understand which are the layers shared between the containers in order to optimize the discovery.

In an embodiment, some basic presumptions can be involved such as, for example, (i) each Docker® (or other) image references a list of read-only layers that represent filesystem differences; and (ii) layers are stacked on top of each other to form a base for a container's root filesystem.

FIG. 10 shows another exemplary method 1000 for efficient management of virtual containers in a desktop environment, in accordance with an embodiment of the present principles.

At step 1010, discover the containers available in the virtual desktop environment (C1, . . . , Cn). In an embodiment, there can hundreds or even thousands of such containers.

At step 1020, for each container, retrieve the list of its layers. In an embodiment, the list can be retrieved using Docker® or other software container related commands.

At step 1030, determine the containers that share common layers (or a subset of them) and the "single" containers (that is, the containers that do not share any layers). For example, (C1, . . . , Ci) share layer1 and layer3, (Cj, . . . , Ck) share layer2 and layer3 and it is possible to have a small set of "single" containers (C1, . . . , Cn) that do not share any layer.

At step 1040, determine the software installed on the common (or subset of) layers. For example layer1, layer2 and layer3 in the example above.

At step 1050, create entries for the detected software installed in containers (C1, . . . , C1) and containers (Cj, . . . , Ck) in the repository.

At step 1060, for any remaining containers not processed in step 1020, perform the classical introspection so as to retrieve information from metadata. For example, in an embodiment, the information is retrieve from Docker® metadata (such as, for example, but not limited to, the keyword FROM and/or the TAGs).

At step 1070, create entries in the detected software installed in (C1, . . . , Cn) in the repository.

While primarily described herein with respect to a single computer processing system, the present principles can be applied in a distributed computing environment such as a cloud computing environment, as readily appreciated by one of ordinary skill in the art given the teachings of the present principles provided herein, while maintaining the spirit of the present principles.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
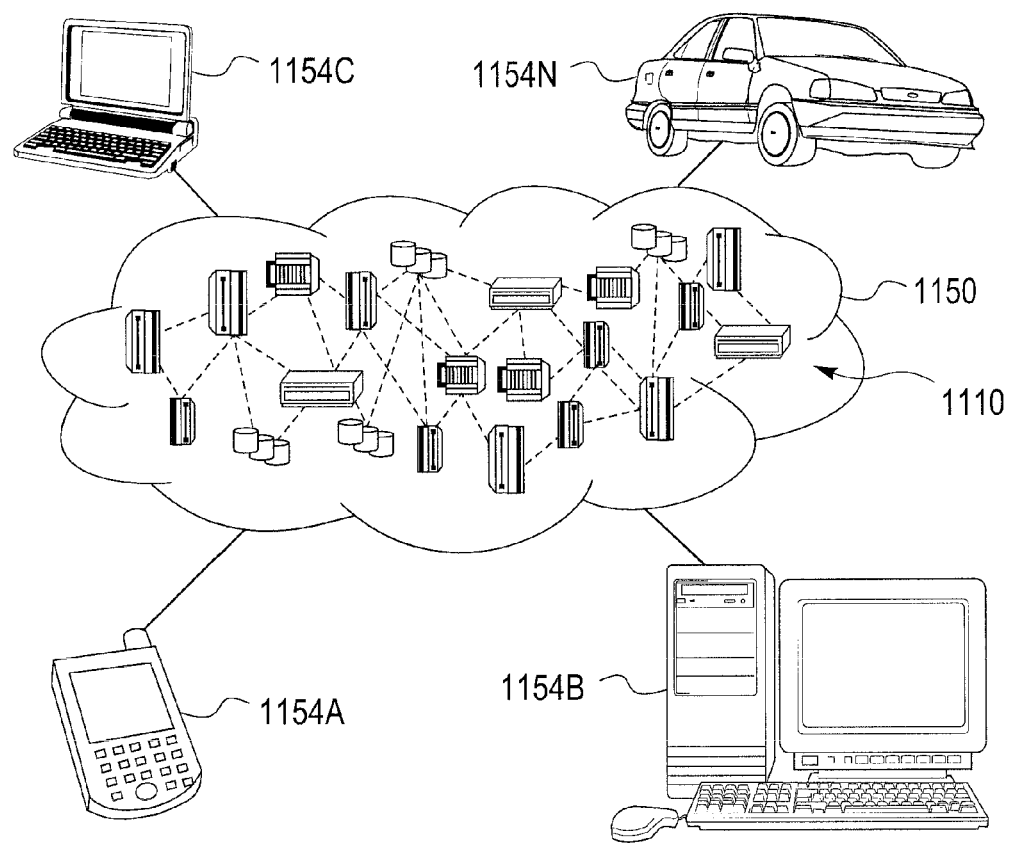
FIG. 11 shows an exemplary cloud computing environment, in accordance with an embodiment of the present principles.

Referring now to FIG. 11, illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
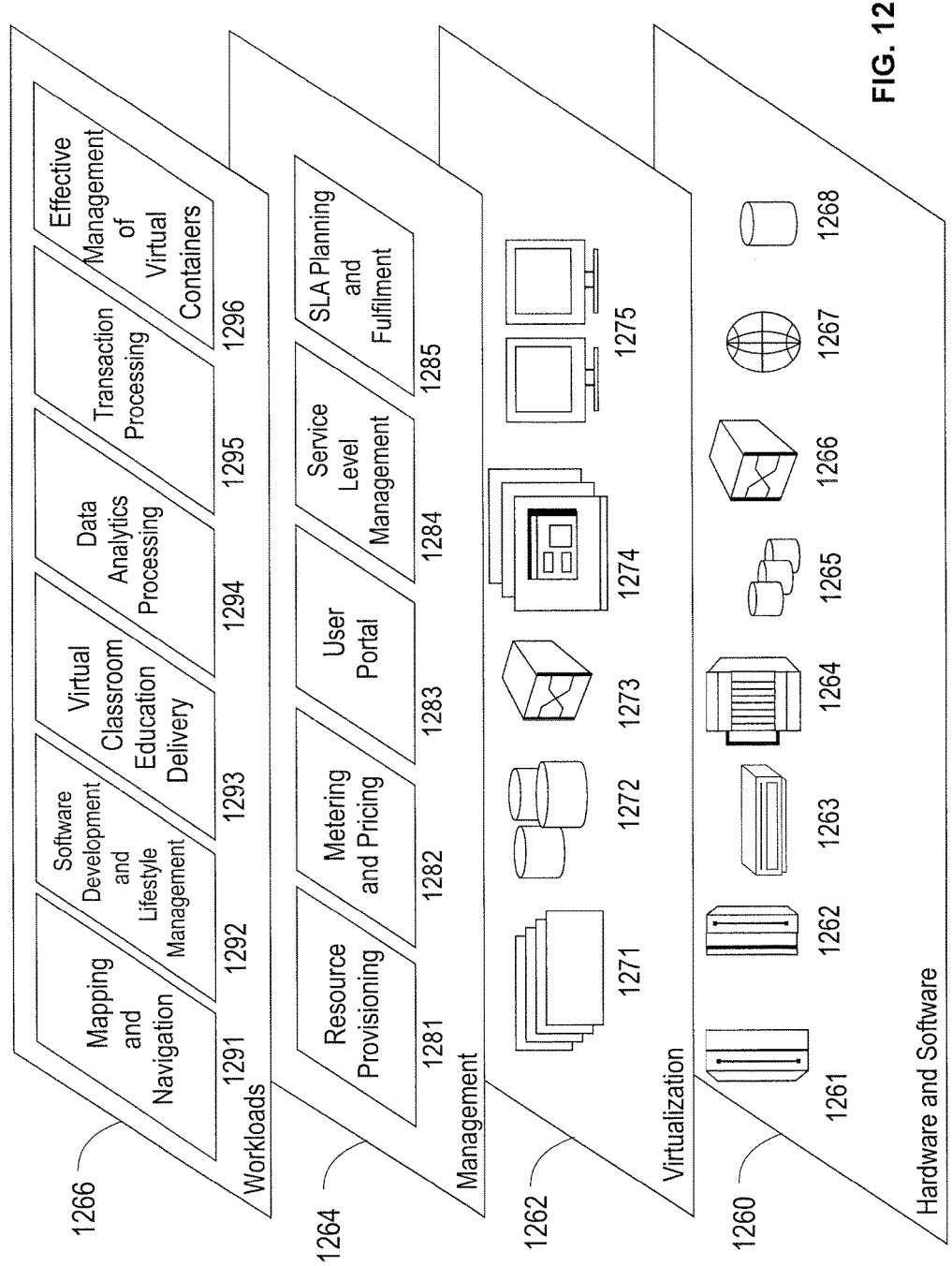
FIG. 12 shows an exemplary set of functional abstraction layers provided by the cloud computing environment shown in FIG. 11, in accordance with an embodiment of the present principles.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized.

Examples of workloads and functions which may be provided from this layer include: mapping and navigation 1291; software development and lifecycle management 1292; virtual classroom education delivery 1293; data analytics processing 1294; transaction processing 1295; and effective management of virtual containers in a desktop environment 1296.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for identifying installed software components in a container running in a virtual execution environment, wherein the container is created by instantiating image data, the method comprising:
   determining a respective identifier for each of individual layers of a layered structure of the image data;
   retrieving from a repository storage arrangement storing information for non-container-based software and container-based software, the information for the container-based software identifying at least one of the installed software components in the container based on the respective identifier for at least one of the individual layers;
   forming, from the information stored in the repository storage arrangement, a displayable data structure allowing row filtering for software management and at least specifying as a respective row in the displayable data structure, for each of the installed software components, (i) a type as one of the non-container-based software or the container-based software, (ii) a virtual machine and an operating system corresponding thereto, and (iii) an operating status of started or stopped; and
   displaying, on a display device, the displayable data structure.

2. The method of claim 1, further comprising:
   determining an existence, in the repository storage arrangement, of information about the installed software components, using the respective identifier for each of the individual layers;
   inspecting the container to generate the information about the installed software components when the information is absent from the repository storage arrangement; and
   storing the generated information about the installed software components in the repository storage arrangement.

3. The method of claim 2, wherein inspecting the container includes analyzing metadata associated with the image data related to the container.

4. The method of claim 2, wherein inspecting the container includes analyzing the image data in a file system tree.

5. The method of claim 1, further comprising ascertaining whether the container shares any of the individual layers with another container.

6. The method of claim 5, further comprising discovering information about the other container responsive to a result of said ascertaining step.

7. The method of claim 6, wherein the information about the other container comprises installed software components in the other container.

8. The method of claim 1, wherein the at least one installed software component in the container is selected from the group consisting of an operating system and an application.

9. The method of claim 8, wherein the operating system is different than a host operating system.

10. The method of claim 1, wherein the method is performed for each of a plurality of containers in the virtual execution environment.

11. A computer program product for identifying installed software components in a container running in a virtual execution environment, wherein the container is created by instantiating image data, the computer program product comprising a non-transitory computer readable storage medium having program instructions embodied therewith, the program instructions executable by a computer to cause the computer to perform a method comprising:
   determining a respective identifier for each of individual layers of a layered structure of the image data;
   retrieving from a repository storage arrangement storing information for non-container-based software and container-based software, the information for the container-based software identifying at least one of the installed software components in the container, based on the respective identifier for at least one of the individual layers;
   forming, from the information stored in the repository storage arrangement, a displayable data structure allowing row filtering for software management and at least specifying as a respective row in the displayable data structure, for each of the installed software components, (i) a type as one of the non-container-based software or the container-based software, (ii) a virtual machine and an operating system corresponding thereto, and (iii) an operating status of started or stopped; and
   displaying, on a display device of the computer, the displayable data structure.

12. The computer program product of claim 11, wherein the method further comprises:

determining an existence, in the repository storage arrangement, of information about the installed software components, using the respective identifier for each of the individual layers;

inspecting the container to generate the information about the installed software components when the information is absent from the repository storage arrangement; and storing the generated information about the installed software components in the repository storage arrangement.

13. The computer program product of claim 12, wherein inspecting the container includes analyzing metadata associated with the image data related to the container.

14. The computer program product of claim 12, wherein inspecting the container includes analyzing the image data in a file system tree.

15. The computer program product of claim 11, wherein the method further comprises ascertaining whether the container shares any of the individual layers with another container.

16. The computer program product of claim 15, wherein the method further comprises discovering information about the other container responsive to a result of said ascertaining step.

17. The computer program product of claim 16, wherein the information about the other container comprises installed software components in the other container.

18. A system for identifying installed software components in a container running in a virtual execution environment, wherein the container is created by instantiating image data, the system comprising:

a processor, configured to:
determine a respective identifier for each of individual layers of a layered structure of the image data;
retrieve from a repository storage arrangement storing information for non-container-based software and container-based software, the information for the container-based software identifying at least one of the installed software components in the container, based on the respective identifier for at least one of the individual layers; and
form, from the information stored in the repository storage arrangement, a displayable data structure allowing row filtering for software management and at least specifying as a respective row in the displayable data structure, for each of the installed software components, (i) a type as one of the non-container-based software or the container-based software, (ii) a virtual machine and an operating system corresponding thereto, and (iii) an operating status of started or stopped; and a display device configured to display the displayable data structure.

19. The system of claim 18, wherein the processor is further configured to:
determine an existence, in the repository storage arrangement, of information about the installed software components, using the respective identifier for each of the individual layers;
inspect the container to generate the information about the installed software components when the information is absent from the repository storage arrangement; and
store the generated information about the installed software components in the repository storage arrangement.

20. The system of claim 18, wherein the processor is further configured to:
ascertain whether the container shares any of the individual layers with another container; and
discover information about the other container responsive to a result of said ascertaining step, wherein the information about the other container comprises installed software components in the other container.

* * * * *